United States Patent [19]
Sanz et al.

[11] Patent Number: 5,662,152
[45] Date of Patent: Sep. 2, 1997

[54] MODULAR AIRCRAFT WINDOW UNIT

[75] Inventors: Eduardo Sanz; Don M. Ellis; Donald J. Martin, all of San Antonio, Tex.

[73] Assignee: MSA Aircraft Interior Products, Inc., San Antonio, Tex.

[21] Appl. No.: 533,168

[22] Filed: Sep. 25, 1995

[51] Int. Cl.$^6$ .................................................. E06B 9/06
[52] U.S. Cl. ............................. 160/84.02; 160/84.06
[58] Field of Search ................... 160/84.02, 84.04, 160/84.06, 84.01, 107, 172 R, 168.1 P, 90, 98, 188, 310

[56] References Cited

U.S. PATENT DOCUMENTS

| | | | |
|---|---|---|---|
| 3,253,644 | 5/1966 | Gotoh et al. | 160/107 |
| 3,576,206 | 4/1971 | Trexler | 160/84.01 |
| 3,777,800 | 12/1973 | Susoev | 160/84.04 |
| 3,842,889 | 10/1974 | Jones | 160/26 |
| 4,202,395 | 5/1980 | Heck et la. | 160/84.01 |
| 4,307,768 | 12/1981 | Anderson | 160/84.01 |
| 4,503,900 | 3/1985 | Osaka et al. | 160/107 X |
| 4,679,610 | 7/1987 | Spraggins | 160/84.02 X |
| 4,915,152 | 4/1990 | Magee | 160/31 |
| 4,938,273 | 7/1990 | Dubbelman et al. | 160/84.02 X |
| 4,998,576 | 3/1991 | Moreno | 160/90 |
| 5,082,043 | 1/1992 | Moreno | 160/90 |
| 5,083,598 | 1/1992 | Schon | 160/84.02 |
| 5,195,569 | 3/1993 | Peterson et al. | 160/84.06 |
| 5,372,173 | 12/1994 | Horner | 160/98 |

*Primary Examiner*—David M. Puhol
*Attorney, Agent, or Firm*—Gunn, Lee & Miller, P.C.

[57] ABSTRACT

The present invention relates to a modular window unit for an aircraft comprising a nonopaque lens and a reveal, the reveal joining the lens, as well as a shade comprising a multiplicity of discrete elongated panels, each panel cooperating with one another and being movable between an open and a closed position. The panels lay one next to the other to substantially cover the lens when the window shade is closed and, in an open position, lay stacked atop each other to substantially uncover the lens. Electric motors are provided for moving the panels of the shade between the open and closed positions.

12 Claims, 3 Drawing Sheets

5,662,152

MODULAR AIRCRAFT WINDOW UNIT

FIELD OF THE INVENTION

A modular aircraft window unit, more specifically, a modular aircraft window unit having a shade comprised of a multiple of separate panels.

BACKGROUND OF THE INVENTION

Most aircraft windows have shades to control the amount of light entering the interior of the aircraft. The simplest aircraft window is typically comprised of retractable shade material with a rail along the bottom. The rail typically has a tab that can be gripped by the passenger for sliding vertically between a closed (usually down) position, in which the window is covered, and an open (usually up) position, allowing light into the cabin.

However, many aircraft, including typically those in the executive jet aircraft class, have rather expensively appointed interiors, including custom designed windows. Sometimes these windows are electric, sometimes manual, or sometimes electric with manual overdrives. These custom interiors also may feature modular windows with shades located between an inner lens and an outer lens and activated by a mechanical or electrical mechanism by the passenger. These modular windows, often built by after-market supply firms and fitted at modification centers ("Mod centers"), have shades made of a variety of materials; but typically, the materials are collapsible between an extended (down or closed) position and a retracted (up or open) position. An example of such modular window units with retractable shades may be found in U.S. Pat. No. 4,679,610 (Spraggins, 1987). The '610 patent features a modular, self-contained window unit having two panes of transparent, impact-resistant glass secured by a frame and having a shade made of a collapsible sheet movable between an open and closed position.

Manufacturers of present window shade material include Hunter-Douglas, which supplies pleated shade materials to Assignee. However, shade material suppliers are limited in the styles and color section which can be provided. Presently used shade materials are typically pleated and collapsible with sufficient rigidity to maintain their shape, form, and uniformity.

Advantages exist in using any upholstery material or fabric. The use of any upholstery material or other sheet of fabric increases the design opportunity available to the interior designer for coordinating the colors and textures of the interior of the aircraft to the window shade material. Thus, greater flexibility is provided in an aircraft window shade which can use any flexible fabric, rather than the limited selection of presently available shade materials.

Some of the present aircraft windows utilize a "Roman shade", that is, one having horizontal pleats. These, however, utilize a bar or rod, or a series of bars or rods, extending horizontally across the windows. From these bars or rods is draped heavy fabric, typically backed with thin foam (such as Insulite). The bars or rods are raised and lowered, deploying fabric as they are lowered and gathering it up as they are raised. Typically, the fabric is a single sheet with multiple pleats and multiple bars or rods. It does not tend to hold its shape well, tends to be heavy, and bulky, especially when the shade is in a raised or up position. Further, it has a limited ability to block out heat, light, and sound, even when in a down or closed position.

SUMMARY OF THE INVENTION

Applicants seek to expand the design options for aircraft interior designers in providing a window unit having a shade capable of utilizing for upholstery material or other flexible fabric material.

This and other objects are provided for in a window unit having a shade consisting of a series of flat or curved, rigid, typically composite panels covered with fabric and installed on the reveal in a manner that allows them to move between an open and closed position, the closed position with the panels stacked one behind the other, the open position allowing them to lay flat, one next to the other.

When the shade is in an extended or closed position, it offers protection against light, noise, and fabric collapse.

The panels of the shade are typically upholstered by the Mod center and, therefore, obtain design flexibility previously unavailable.

The panels are connected, one to another, and through a guide mechanism on either side of the reveal. Two motors provide power to raise and lower the shade via a belt. The motors are independently controlled by separate speed control modules that allow for multiple switches and independent speed control.

Magnetic switches located at either end of the desired travel of the shade are operatively connected to the motor to switch the power off when the limit of travel is reached. One advantage of independent motors on each end of the panels is that of self-leveling. That is, a motor will continue to travel, if one side lags, until the desired travel limit (magnetic switch) is reached.

The entire window unit having applicants' unique shade is typically manufactured in a self-contained, easy-to-install assembly.

DETAILED DESCRIPTION OF THE PREFERRED EMBODIMENT

Applicants provide a modular window unit (10) which incorporates a typically transparent lens (12) supported and typically surrounded by a reveal (14) which acts as the body of the window unit and typically is made from fiberglass or a composite material. Applicants' modular window unit (10) includes a shade (16) movable between a closed or down position (FIG. 2) and an open or up position (FIG. 3) or any position therebetween (see FIG. 1, partially open).

Figure 7:
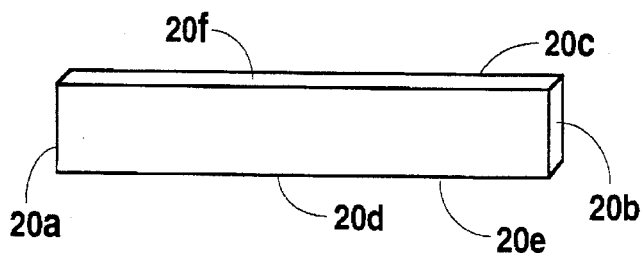
FIG. 7 is a perspective view from the front of a panel of applicants' shade.

With reference now to FIGS. 1–8, it is seen that the modular unit of applicants' invention provides for a unique shade having a multiplicity of panels, here, by way of example and not limitation, five in number and designated as panels (18a) through (18d), movable, as well as a fixed or valence panel (18e). With reference to FIG. 7, each panel is seen to have the removed ends (20a) and (20b), a top edge (20c), a bottom edge (20d), a front surface (20e), and a rear surface (20f). The panels engage one another and also engage the reveal (14) through guide means (22a), the function of guide means (22a) being to maintain proper alignment among the panels and with the remainder of the modular unit, more specifically, the reveal (14). Panels (18a) through (18d) (movable) also are engaged to drive means (22b) as is more specifically illustrated in FIGS. 3, 6A and 6B. Drive means (22b) is powered typically by a pair of motors (38a) and (38b) whose speed is controlled through a pair of speed control modules (40a) and (40b).

Figure 1:
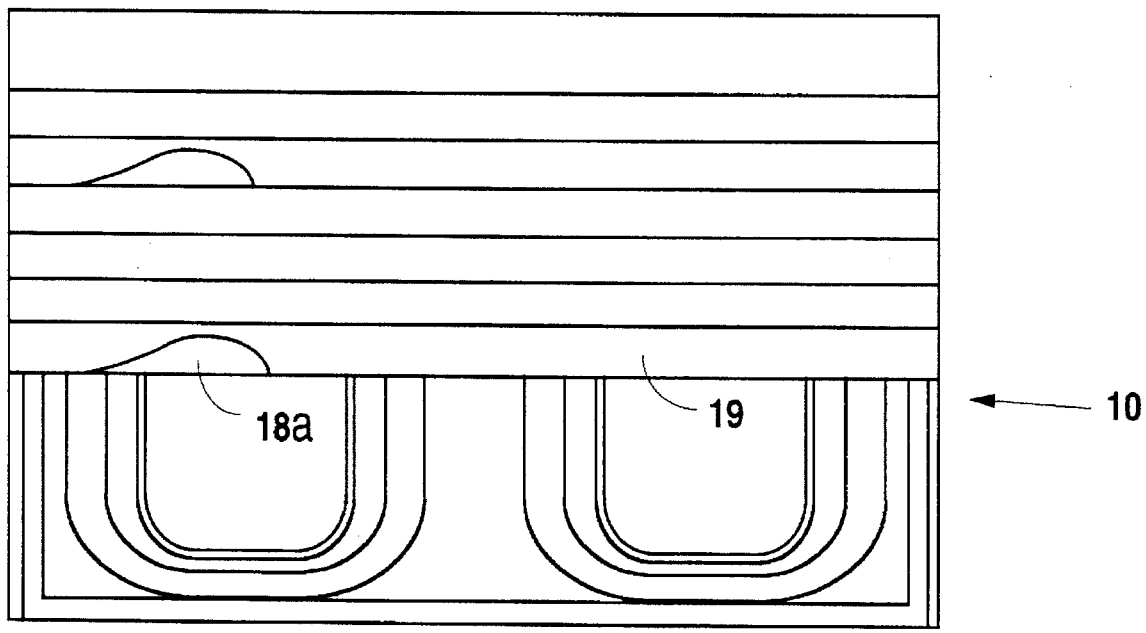
FIG. 1 is a front elevational view of applicants' modular window unit featuring the pleated shade.
Figure 2:
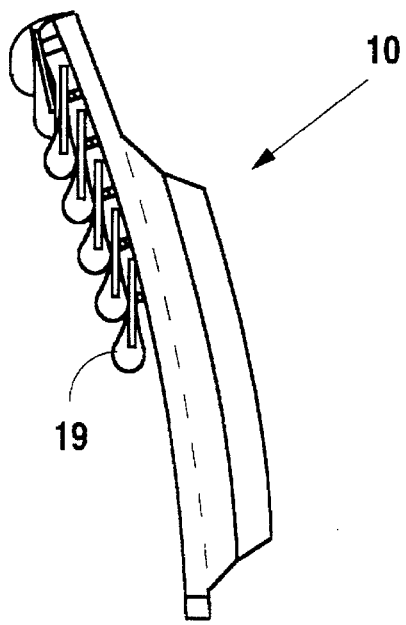
FIG. 2 is a side elevational view of applicants' modular window unit.
Figure 3:
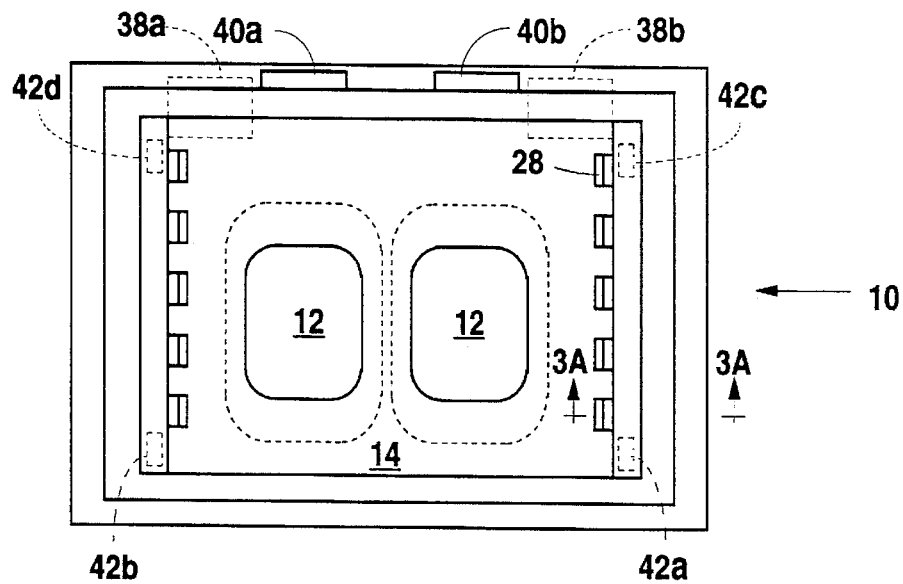
FIG. 3 is a front elevational view of applicants' modular window unit with the shade panels partially removed to illustrate some of the interior mechanism.

With reference to more details in the figures, it is noted that FIGS. 1 through 3 illustrate shade (16) comprising a multiplicity of panels, including a plurality of movable panels (18a) through (18d) and a fixed panel (18e) attached horizontally along the top of the reveal (14) in a fixed position. It is further seen that each of the panels (movable as well as fixed) has draped over the exterior a fabric (19), typically cloth, typically an upholstery-type cloth fabric, draped over the panel itself. The panel itself is typically flat or slightly curved; providing a panel slightly curved in cross section (see FIG. 4) gives some rigidity or stiffness to the panels. The panels are typically comprised of P.V.C. foam core with fiberglass skins and are typically about 0.12 inch thick. The panels stretch horizontally across the windows to cover the lens (12) as well as substantially cover the reveal (14). The panels could cover one, two, three, or more lenses. It is noted, specifically with reference to FIGS. 2, 4, and 5, how the panels, in an up or retracted position, stack one beneath the other. In a full down position (see FIG. 4), the panels typically lay with their top edge of one panel just adjacent to or just beneath the bottom edge of the panel below it. In a full down (shade closed) position, bottom edge (22d) of panel (18a) will typically shut off view of the reveal (14) and/or lens (12) from the interior of the aircraft. In a position between full down or full up, there is partially overlap of panels, as may be appreciated with reference to FIG. 2.

It is noted with reference to FIGS. 1 and 2, especially FIG. 2, how upholstery or cloth (19) tends to drape over the panel just below it to give a pleasing pleated effect. Upholstery (19) may be attached to panels (18a) through (18e) by gluing, fastening with clips along the top edge of the panels, or other means.

As the panels move between the up and the down position, they must maintain alignment with one another as well as alignment with the reveal. Proper alignment requires that the moving panels maintain a parallel alignment with one another as well as with the top and bottom edges of the window unit. This is done by incorporating a guide mechanism which allows the movable panels to cooperate with the reveal and each other to maintain such an alignment.

Figure 8:
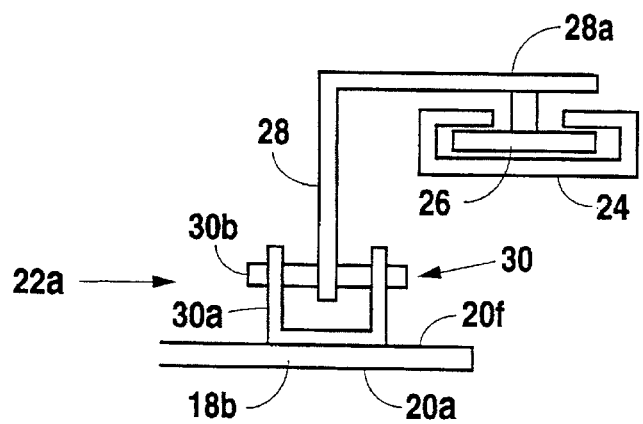
FIG. 8 is a top elevational view of the guide (tracking) mechanism of applicants' modular window unit.

FIG. 8 reveals details of guide means (22a). Each of the movable panels will utilize guide means on each end. Here, reference is made (for the sake of example) to panel end (20a) of movable panel (18b). It is seen in FIG. 8 that, attached to rear surface (20f) of panel end (20b) of panel (18b) is a panel support member mounting means (30) which is comprised of a U-shaped bracket (30a) and a pin (30b) extending between the two opposite arms of the "U" of U-shaped bracket (30a). Articulating on pin (30b) is panel support member (28) typically L-shaped and made of aluminum. Removed end (28a) of panel support member (28) has attached thereto nylon slider (26), which here is seen to be T-shaped, and engages track (24), typically channel aluminum, which is attached to reveal (14) as is more clearly illustrated with reference to FIG. 3, by attachment plate (25). The slider rides in the track as the shade moves, keeping the panels from wandering laterally. It is to be pointed out that pin (30b) allows the articulation of panel support member (28) such that the panels can pivot as they ride over the curved surface of the track (see FIG. 2).

Each end of each movable panel is provided with this guide means. Included on each panel support member (28) of the movable panels is a length of string (32) (see FIG 3A) which attaches to the top of panel support member (28) and to the bottom of the adjacent panel support member just above. The strings are equal in length and will control the distance between adjacent panels when the shade is in the open position. See FIG. 4 with reference to the manner in which strings allow for proper separation of one shade with respect to the other.

Figure 3A:
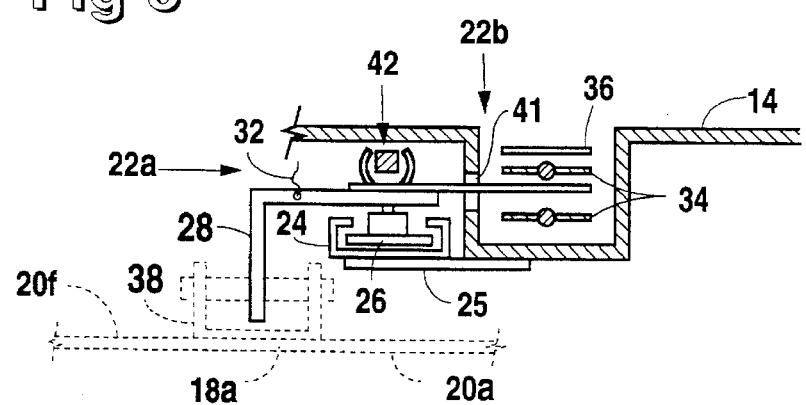
FIG. 3A is a top elevational view of the details of the drive mechanism of the shade of applicants' modular window unit.

Applicants also provide for a drive mechanism or drive means (22b) to power the windows between the up and down position or to stop at any place therebetween. With reference to FIGS. 1 and 3A, it is seen that the drive mechanism is provided through engagement at removed panel ends (20a) and (20b) of the lowest panel, here movable panel (18a), of a belt engagement plate (36). More specifically, belt engagement plate (36) has a leg (36a) for extending through a slot (41) in the walls of the reveal (14), here the walls of the reveal (14) are convoluted to incorporate applicants' drive means (see FIG. 6A) and belt. The leg of belt engagement plate (36) attaches to panel support member (28) at or near the removed end thereof. Belt engagement plate (36) also has, opposite the leg, removed arms (36b) and (36c) which are J-shaped and include slots (36d). The slots are dimensioned for receipt of a belt (34) therein, but are sufficiently narrow to capture balls (34a) spaced along chain (34b) of belt (34) such that movement of the belt is transmitted to belt engagement member (36). Further, it is seen with reference to FIGS. 6A and 6B how the belt ends are captured in the slots between arms (36b) and (36c) of belt engagement member (36). The belt is driven by a gear (not shown) which is attached to the output shafts of the electric motors, here typically two motors, as illustrated at (38a) and (38b). The motors are energized by the electrical system of the aircraft, through speed control modules (40a) and (40b) and passenger-accessible switches. Suitable motors may be purchased from Micromotors of St. Petersburg, Fla., as Model No. 2233F030. Suitable speed control modules are manufactured by Total Texas Technologies as part No. MSA-08B.

Magnetic limit switches provide for a means of cutting off the electric motors when the panel ends reach the up or down limit. More specifically, magnetic switches (42a) through (42d) are connected to the motors to shut off and deenergize the motors when shade (18a) reaches the lower position—magnetic switch (42a) to motor (38a) and magnetic switch (42b) to motor (38b)—or the upper position—magnetic switch (42c) to motor (38b) and magnetic switch (42d) to motor (38a). The magnetic limit switches are mounted to the reveal (14) and wired to the proper motor. It is seen that, if one end lags slightly lower than the other at the lower limit of travel, the magnetic switch will shut off the motor for the lower end earlier than the other, allowing for a self-leveling effect. Going up, the lower end motor will stay on longer to let the lower end "catch up". When the shade is first installed, the technician will adjust the speed control module so the motors raise and lower the shades at the same rate, thus tending to maintain proper shade alignment. Nonetheless, should the speed drift somewhat or other events occur, the use of two motors with independent sets of limit switches allow for self-leveling.

Applicants' novel window may be used in aircraft as well as any suitable and appropriate environment. Recreational vehicles, yachts, and trains may also take advantage of the improvements and utility offered by applicants' design.

Figures 4, 5:
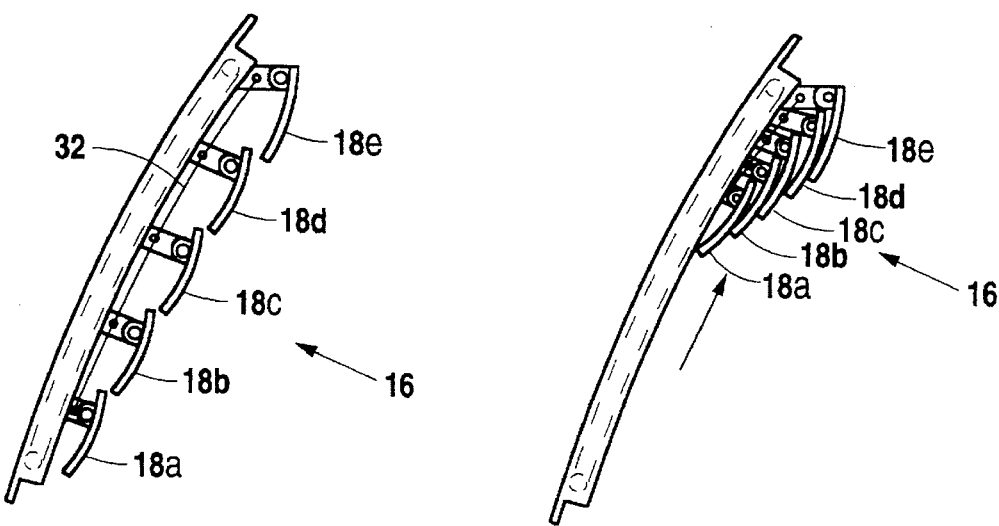
FIG. 4 is a side elevational view of applicants' modular window unit with the shade in the down position.
FIG. 5 is a side elevational view of applicants' modular window unit with the shade in the up position.
Figure 6A:
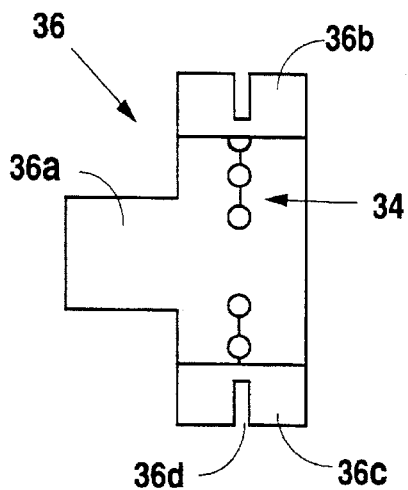
FIGS. 6A and 6B are front and side elevational views, respectively, of the belt engagement member of the drive mechanism of the shade of applicants' modular window unit.
Figure 6B:
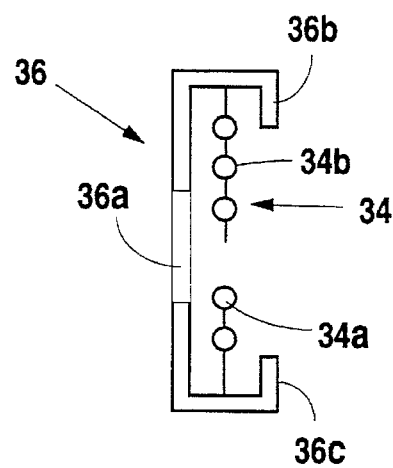

When the shade is in the full up position, the panels are stacked, suspended generally vertically as indicated in FIG. 5, with the outer panels covering at least half or more of the surfaces of the panels just below (see also FIG. 2). When the motors are energized, the entire stack of movable panels (18a) through (18d) will begin to move down until the string between (18e) and (18d) is taut, at which time panel (18d) will be deployed. Continued movement downward from there will subsequently deploy panels (18c), (18b), and finally (18a) will reach its limit switch at about the time it is fully deployed beneath panel (18b). The use of a string, along with a curved track and the articulating pin (30b) allows for the movement of the shade along a curved path. That is, the profile of the window unit is typically curved, as may be appreciated with reference to FIG. 2, to correspond to the curve of the interior of the aircraft cabin.

It should be appreciated that each panel is suspended and allowed to hang generally vertically on pins (30b), whether the shade is up or down or in between. Further, these pins may be of the quick-release type or a ball-lock type pin. The advantage of such a pin is the ease of removal, especially important as it is anticipated that a unit with uncovered panels will be shipped to Mod centers for the Mod center to cover and install. The less work (and ease) in installing the panels (after covering) by the Mod center, the more attractive the unit is. A ball-lock type pin may be used to install the panels without the use of tools.

When the shade is in a full down position and is activated, the drive means will act on panel (18a) and retract it until it engages the panel just above it—panel (18b). Further retraction will allow the two panels to move as a unit and subsequently pick up panels (18c) and (18d) as they move to the full up position.

It is noted that applicants' unique shade may be raised manually by mechanical actuation. Means of mechanically raising shades are described in applicants' earlier patents, including U.S. Pat. Nos. 4,679,610; 4,998,576; and 5,082,043, which patents are incorporated herein by reference.

Additional applications of applicants' window include military vehicles, including light armor vehicles. Indeed, applicants' unique panels may be constructed of bulletproof and/or bullet-resistant Kevlar and/or fiberglass composites.

The surfaces (outer or inner) of applicant' panels may be covered flush with fabric, leather, wood grain finish, paint, mirror surfaces (such as polished aluminum or the like), or other suitable material. Applicants' panels may have a coating on the outside surface comprising a metallic sheet or the panel itself may be metallized or have a reflective coating to help reflect intense light and/or radiation. The panel may have a soft coating on the inside of the shade. The core of the panel itself may be made of graphite or a carbon/graphite composite. Panels may be made of a graphite or phenalic skin on an inboard side of a honeycomb core, with a polished aluminum skin on the outside. Such a panel would help prevent or minimize light flash and heat from an atomic or nuclear blast, especially when fitted in a AWAC (Airborne Command Post).

Other appropriate materials of which panels may be constructed include NOMEX® or a NOMEX®/felt composite or honeycomb material (with or without skin) which is light, strong, and sufficiently fire resistant to comply with most aircraft regulations and specifications.

Terms such as "left," "right," "up," "down," "bottom," "top," "front," "back," "in," "out," and like are applicable to the embodiments shown and described in conjunction with the drawings. These terms are merely for purposes of description and do not necessarily apply to the position or manner in which the invention may be constructed for use.

Although the invention has been described in connection with the preferred embodiment, it is not intended to limit the invention's particular form set forth, but on the contrary, it is intended to cover such alternatives, modifications, and equivalences that may be included in the spirit and scope of the invention as defined by the appended claims.

What is claimed is:

1. A modular window unit, the modular window unit comprising:

a nonopaque lens;

a reveal, the reveal joining said lens;

a shade, said shade comprising a multiplicity of discrete, elongated panels, at least some of said panels cooperating one with another and movable between a closed position, wherein the panels lay one next to the other so as to substantially cover said lens and an open position where the panels are layered, substantially one atop the other, to substantially uncover the lens, said shade engaging said reveal; and means for moving the movable panels of said shade between the open position and the closed position.

2. The modular window unit of claim 1, wherein said means for moving said panels includes an electric motor.

3. The modular window unit of claim 1, wherein said means for moving the movable panels of said shade includes a pair of electric motors.

4. The modular window unit of claim 1, wherein the movable panels of said shade are rectangular, the panels having a top edge, a bottom edge, and two removed end edges, and are covered with a cloth.

5. The modular window unit of claim 1 further including guide means engageable with said reveal, said shade and said means for moving said panels, said guide means for maintaining lateral alignment between said shade and said reveal.

6. The modular window unit of claim 5, wherein said means for moving the movable panels of said shade includes a pair of electric motors.

7. The modular window unit of claim 6, wherein the panels of said shade are rectangular, the panels having a top edge, a bottom edge, and two removed end edges, and are covered with fabric.

8. The modular window unit of claim 7, wherein said guide means includes a track and a slider, the track attached to said reveal and the slider attached to the movable shade.

9. The modular window unit of claim 8 further comprising two belts and a panel engagement means, the belts for engaging the motors and the panel engagement means for engaging the belts and the panels.

10. The modular window unit of claim 5, wherein the movable panels of said shade are rectangular, the panels having a top edge, a bottom edge, and two removed end edges, and are covered with a cloth.

11. The modular window unit of claim 10 further comprising self-leveling means to maintain parallel alignment among the movable panels.

12. The modular window unit as set forth in claim 1 further comprising articulation means cooperating with said panels and said moving means for allowing said panels to hang vertically and pivotally from said moving means.

* * * * *